United States Patent
Amulu et al.

(10) Patent No.: US 11,714,807 B2
(45) Date of Patent: Aug. 1, 2023

(54) PLATFORM FOR CONVERSATION-BASED INSIGHT SEARCH IN ANALYTICS SYSTEMS

(71) Applicant: SAP SE, Walldorf (DE)

(72) Inventors: James Michael Amulu, Chennai (IN); Ranganathan Natarajan, Bangalore (IN)

(73) Assignee: SAP SE, Walldorf (DE)

(*) Notice: Subject to any disclaimer, the term of this patent is extended or adjusted under 35 U.S.C. 154(b) by 569 days.

(21) Appl. No.: 16/726,462

(22) Filed: Dec. 24, 2019

(65) Prior Publication Data

US 2021/0191923 A1 Jun. 24, 2021

(51) Int. Cl.
| | |
|---|---|
| *G06F 16/242* | (2019.01) |
| *G06F 16/2455* | (2019.01) |
| *G10L 15/18* | (2013.01) |
| *G10L 15/22* | (2006.01) |

(52) U.S. Cl.
CPC ...... *G06F 16/243* (2019.01); *G06F 16/24553* (2019.01); *G10L 15/1815* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 8,484,255 B2 | 7/2013 | Amulu et al. | |
| 9,501,585 B1* | 11/2016 | Gautam | ............... G06F 16/3328 |
| 9,519,701 B2 | 12/2016 | Amulu et al. | |
| 9,665,351 B2 | 5/2017 | Amulu | |
| 10,515,121 B1* | 12/2019 | Setlur | ............... G06F 16/90332 |
| 10,817,527 B1* | 10/2020 | Setlur | ............... G06F 16/90332 |
| 11,017,764 B1* | 5/2021 | Das | .................... G10L 15/18 |
| 11,132,509 B1* | 9/2021 | Pasko | ................... G06F 18/214 |
| 2012/0143831 A1* | 6/2012 | Amulu | ............... G06Q 10/0637 |
| | | | 715/764 |
| 2014/0130008 A1 | 5/2014 | Amulu | |
| 2014/0136257 A1 | 5/2014 | Amulu | |
| 2014/0143270 A1 | 5/2014 | Amulu et al. | |
| 2014/0149093 A1 | 5/2014 | Amulu | |
| 2014/0351232 A1* | 11/2014 | Fan | ................... G06Q 10/06314 |
| | | | 707/706 |
| 2015/0278213 A1* | 10/2015 | Anand | ............... G06F 16/24578 |
| | | | 707/723 |

(Continued)

OTHER PUBLICATIONS

U.S. Appl. No. 16/220,044, filed Dec. 14, 2018, Tv et al.

(Continued)

*Primary Examiner* — Jonathan C Kim
(74) *Attorney, Agent, or Firm* — Fish & Richardson P.C.

(57) ABSTRACT

Methods, systems, and computer-readable storage media for receiving, by a conversation-based search system (CSS) of an analytics system, verbal input from a user, providing, by the CSS, text input based on the verbal input, processing, by the CSS, the text input to determine a set of contexts, each context in the set of context representing one or more operations of an enterprise, determining, by the CSS, one or more insights based on the set of contexts, each insight representative of a performance of the enterprise, and displaying, by the analytics system, a story comprising one or more visualizations, each visualization depicting at least one insight.

20 Claims, 4 Drawing Sheets

(56) References Cited

U.S. PATENT DOCUMENTS

| | | | | |
|---|---|---|---|---|
| 2018/0203924 A1* | 7/2018 | Agrawal | ................. | G06F 40/58 |
| 2018/0364975 A1* | 12/2018 | Kwong | ................. | G06F 3/167 |
| 2019/0095444 A1* | 3/2019 | Payne | ................. | G06F 40/284 |
| 2019/0138648 A1* | 5/2019 | Gupta | ................. | H04L 51/02 |
| 2019/0171777 A1* | 6/2019 | Sobhy Deraz | ............ | G06F 9/54 |
| 2019/0236144 A1* | 8/2019 | Hou | ................. | G06F 40/30 |
| 2019/0332647 A1* | 10/2019 | Rincon Opden Bosch | ................. | |
| | | | | G06F 40/14 |
| 2019/0384815 A1* | 12/2019 | Patel | ................. | G06F 40/151 |
| 2020/0089760 A1* | 3/2020 | Ericson | ............. | G06F 3/04812 |
| 2020/0110779 A1* | 4/2020 | Setlur | ............... | G06F 16/24522 |
| 2020/0110803 A1* | 4/2020 | Djalali | ................. | G06F 16/904 |
| 2020/0251111 A1* | 8/2020 | Temkin | ................. | G10L 15/22 |
| 2021/0166684 A1* | 6/2021 | Cohen | ................. | G05B 19/042 |
| 2021/0191923 A1* | 6/2021 | Amulu | ................ | G10L 15/1815 |
| 2021/0256224 A1* | 8/2021 | Tory | ................. | G06F 40/20 |

OTHER PUBLICATIONS

Extended European Search Report issued in European Application No. 20203195.1 dated Apr. 14, 2021, 7 pages.
Blogs.sap.com [online], "Deep Dive : Search to Insight with SAP Analytics Cloud Webcast Recap Q&A" Feb. 25, 2019, [retrieved on May 18, 2022], retrieved from : URL <https://blogs.sap.com/2019/02/25/deep-dive-search-to-insight-with-sap-analytics-cloud-webcast-recap-qa/>, 9 pages.
Communication Pursuant to Article 94 (3) EPC issued in European Application No. 20203195.1 dated May 11, 2022, 10 pages.

* cited by examiner

PLATFORM FOR CONVERSATION-BASED INSIGHT SEARCH IN ANALYTICS SYSTEMS

BACKGROUND

Enterprises use software systems to conduct operations. Through use of the software systems, enterprises can generate and accumulate massive amounts of enterprise data. Example enterprise data can include, without limitation, product data, financial data, human resources (HR) data, and the like. Enterprises, however, need to understand the enterprise data in order to effectively conduct operations. Intelligent analytics systems have been developed, which process enterprise data to provide useful information, which can be referred to as insights. Insights can be described as statistics, facts, trends, and the like, that can be determined from the enterprise data. Example insights include, without limitation, highest rated product, revenue, margin, actual sales, forecast sales, and the like.

Some analytics systems enable users to submit text-based queries to search for insights. For example, a search interface can be displayed, and the user can input a text-based search query (e.g., [actual revenue compared to forecast revenue for 2018]). The analytics system processes the search query and provides a list of insight results, which the user can select from. For example, the user can select an insight result for inclusion in a so-called story. In some examples, a story can include as one or more pages (e.g., displayed in a user interface (UI)) that can each display one or more visualizations based on enterprise data and one or more insights.

However, traditional insight search systems are relatively primitive in nature. For example, such insight search systems only enable search based on prebuilt modeled objects having searchable metadata. Further, to effectively engage with such insight search systems, a user needs to know the context that the search is to be conducted over (e.g., which model(s) is/are to be used) and/or measures and/or dimensions that are sought, which is often not the case. In other words, traditional insight search systems lack an understanding of users and operate with the expectation that the user is fully aware of what they are looking for. Further, the output of traditional insight search systems can be minimal in nature, and not readably consumable in a form for further analysis.

SUMMARY

Implementations of the present disclosure are directed to a conversation-based search system (CSS) for analytics systems. More particularly, and as described in further detail herein, the CSS of the present disclosure receives search queries as verbal input from users, processes the verbal input to provide text input, determines one or more contexts based on the text input, provides a content to data scope mapping based on the one or more contexts, provides and execute queries based on the content to data scope mapping to provide query results as one or more insights, and display the insights (e.g., as one or more visualizations). In some examples, the insights are displayed within a newly created story that is generated in response to receipt of the verbal input. In some examples, the insights are displayed within an existing story that is generated prior to receipt of the verbal input.

In some implementations, actions include receiving, by a conversation-based search system (CSS) of an analytics system, verbal input from a user, providing, by the CSS, text input based on the verbal input, processing, by the CSS, the text input to determine a set of contexts, each context in the set of context representing one or more operations of an enterprise, determining, by the CSS, one or more insights based on the set of contexts, each insight representative of a performance of the enterprise, and displaying, by the analytics system, a story comprising one or more visualizations, each visualization depicting at least one insight. Other implementations of this aspect include corresponding systems, apparatus, and computer programs, configured to perform the actions of the methods, encoded on computer storage devices.

These and other implementations can each optionally include one or more of the following features: the text input is provided by processing the verbal input through one or more natural language system (NLS) libraries; actions further include determining a data fence for the user at least partially based on a role that is assigned to the user, the data fence determining one or more data sources to be accessed to determine the set of contexts; actions further include determining that a configuration setting indicates that the CSS is accessible to the user, and in response, enabling the CSS to receive the verbal input from the user; actions further include providing an intermediate story based on at least one insight of the one or more insights, wherein at least a portion of the intermediate story is included in the story; at least one context is determined as a leading context and at least one context is determined as an intermediate context; and contexts in the set of contexts are provided in a rank order.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a conversation-based search system (CSS) for analytics systems. More particularly, and as described in further detail herein, the CSS of the present disclosure receives search queries as verbal input from users, processes the verbal input to provide text input, determine one or more contexts based on the text input, provide a content to data scope mapping based on the one or more contexts, provide and execute queries based on the content to data scope mapping to provide query results as one or more insights, and display the insights (e.g., as one or more visualizations). In some examples, the insights are displayed within a newly created story that is generated in response to receipt of the verbal input. In some examples, the insights are displayed within an existing story that is generated prior to receipt of the verbal input.

Implementations can include actions of receiving, by a CSS of an analytics system, verbal input from a user, providing, by the CSS, text input based on the verbal input, processing, by the CSS, the text input to determine a set of contexts, each context in the set of context representing one or more operations of an enterprise, determining, by the CSS, one or more insights based on the set of contexts, each insight representative of a performance of the enterprise, and displaying, by the analytics system, a story comprising one or more visualizations, each visualization depicting at least one insight.

Implementations of the present disclosure are described in further detail with reference to an example analytics system, SAP Analytics Cloud (SAC) provided by SAP SE of Walldorf, Germany. SAC can be described as an all-in-one platform for business intelligence, planning, and predictive analytics to support enterprise operations. It is contemplated, however, that implementations of the present disclosure can be realized in any appropriate analytics system.

To provide further context for implementations of the present disclosure, and as introduced above, enterprises use software systems to conduct operations. Through use of the software systems, enterprises can generate and accumulate massive amounts of enterprise data. Example enterprise data can include, without limitation, product data, financial data, human resources (HR) data, and the like. Enterprise, however, need to understand the enterprise data in order to effectively conduct operations. Intelligent analytics systems (e.g., SAC) have been developed, which process enterprise data to provide useful information, which can be referred to as insights. Insights can be described as statistics, facts, trends, and the like, that can be determined from the enterprise data. Example insights include, without limitation, highest rated product, revenue, margin, actual sales, forecast sales, and the like.

Some analytics systems enable users to submit text-based queries to search for insights. For example, a search interface can be displayed, and the user can input a search query (e.g., [actual revenue compared to forecast revenue for 2018]). The analytics system processes the search query and provides a list of insight results, which the user can select from. For example, the user can select an insight result for inclusion in a so-called story. In some examples, a story can include as one or more pages (e.g., displayed in a user interface (UI)) that can each display one or more visualizations based on enterprise data and one or more insights.

However, traditional insight search systems are relatively primitive in nature. For example, such insight search systems only enable search based on prebuilt modeled objects having searchable metadata. Further, to effectively engage with such insight search systems, a user needs to know the context that the search is to be conducted over (e.g., which model(s) is/are to be used) and/or measures and/or dimensions that are sought, which is often not the case. In other words, traditional insight search systems lack an understanding of users and operate with the expectation that the user is fully aware of what they are looking for. This is often not the case, such as in cases where users are not domain experts, or even domain-proficient. Further, the output of traditional insight search systems can be minimal in nature, and not readably consumable in a form for further analysis.

In view of the above context, implementations of the present disclosure provide a CSS for analytics systems. More particularly, and as described in further detail herein, the CSS of the present disclosure receives search queries as verbal input from users, processes the verbal input to provide text input, determines one or more contexts based on the text input, provides a content-to-datascope mapping based on the one or more contexts, provides and executes queries based on the content-to-datascope mapping to provide query results as one or more insights, and displays the insights (e.g., as one or more visualizations). In some examples, the insights are displayed within a newly created story that is generated in response to receipt of the verbal input. In some examples, the insights are displayed within an existing story that is generated prior to receipt of the verbal input.

To provide further context for implementations of the present disclosure, analytics systems can use models and stories to provide and publish insights. In some examples, models can be considered as the foundation for data exploration and developing insights. In some examples, a model includes one or more measures and one or more dimensions, and each model provides a framework for data visualizations (e.g., charts, tables, graphs) that can be incorporated into stories. Example models can include analytic models and planning models. In some examples, models enable enterprise data to be prepared for analytics. Within a model, a user can define measures and dimensions, create calculations, set up hierarchical relationships, geo-enrich data, and the like. In enterprise operations, example measures can include, without limitation, sales, revenue, profits, expenses, budget, forecast. Example dimensions can include, without limitation, time, location, product. In some examples, each dimension can have one or more sub-dimensions. For example, the time dimension can include sub-dimensions of year, each sub-dimension of year can include sub-dimensions of quarter, each sub-dimension of quarter can include sub-dimensions of month, each sub-dimension of month can include sub-dimensions of week, and so on. As another example, the product dimension can include sub-dimensions of category, and each sub-dimension of category can include sub-dimensions of line. As another example, the location dimension can include sub-dimensions of country, each sub-dimension of country can include sub-dimensions of region (e.g., north, east, west, south, mid-west), each sub-dimension of region can include sub-dimensions of sub-region (e.g., state, province), and each sub-dimension of sub-region can include sub-dimensions of city. In some examples, models can be used to setup budgets and forecasts, create versions of model data, copy/past data, and to spread, distribute, and allocate features.

In some examples, data-driven stories are provided that convey meaningful insights and enable enterprises to make better decisions in its operations. In some examples, a story can be provided as a user interface (UI) that displays enterprise data, analytical data, and insights. In short, stories are where enterprise data comes to life. In a story mode, enterprise data and insights are visualized (e.g., as charts, graphs, tables). The visualizations in a story are based on the measures and dimensions contained in one or more underlying models, and are used for analysis, planning, and reporting.

As introduced above, implementations of the present disclosure provide a CSS within an analytics system that enables users to verbally converse with an analytics system to generate insights (also referred to herein as smart insights) that can be included in a story. This process provided by the CSS can be generally referred to as converse-to-insights (C-to-I). In accordance with implementations of the present disclosure, converse-to-insights enables users to converse naturally with the CSS of the analytics system without having any prepared context in mind. Further, the CSS provides progressively deeper insights (e.g., more detailed insights) as the conversation progresses. In some implementations, the CSS accesses enterprise-wide data sources, from which insights can be contextually built. In some examples, a set of data sources is selected based on a data fence, as well as detecting the conversing language and context, and determining access the user is allowed to have (e.g., based on role and expertise in the enterprise).

As described in further detail herein, the CSS uses one or more natural language system (NLS) libraries to understand verbal input provided by the user. During a session, the NLS libraries are continuously maintained during interaction to make enable human-like conversation in the enterprise context. This connects the context of the user's input to enterprise data (e.g., within the data fence) to provide relevant insights. In enterprise operations, example contexts can include, without limitation, sales, financials, supply chain, and purchasing. This leads the user to converse a leading context that the user is interested in discovering insights in the form of stories. A leading context can be described as a primary context that the verbal input is directed to. One or more other contexts can be connected to the leading context (e.g., sales can be connected to financials). As described in further detail herein, the user may have an option to smart freeze the insights in any stage of the converse process and inject intermediate insights into stories, which at later point in time can be refined and consumed. In some examples, the leading context is used to provide non-redundant insight by eliminating the current context and allows user to deep mine to sources that are available and are not used in any analytical model building.

Figure 1:
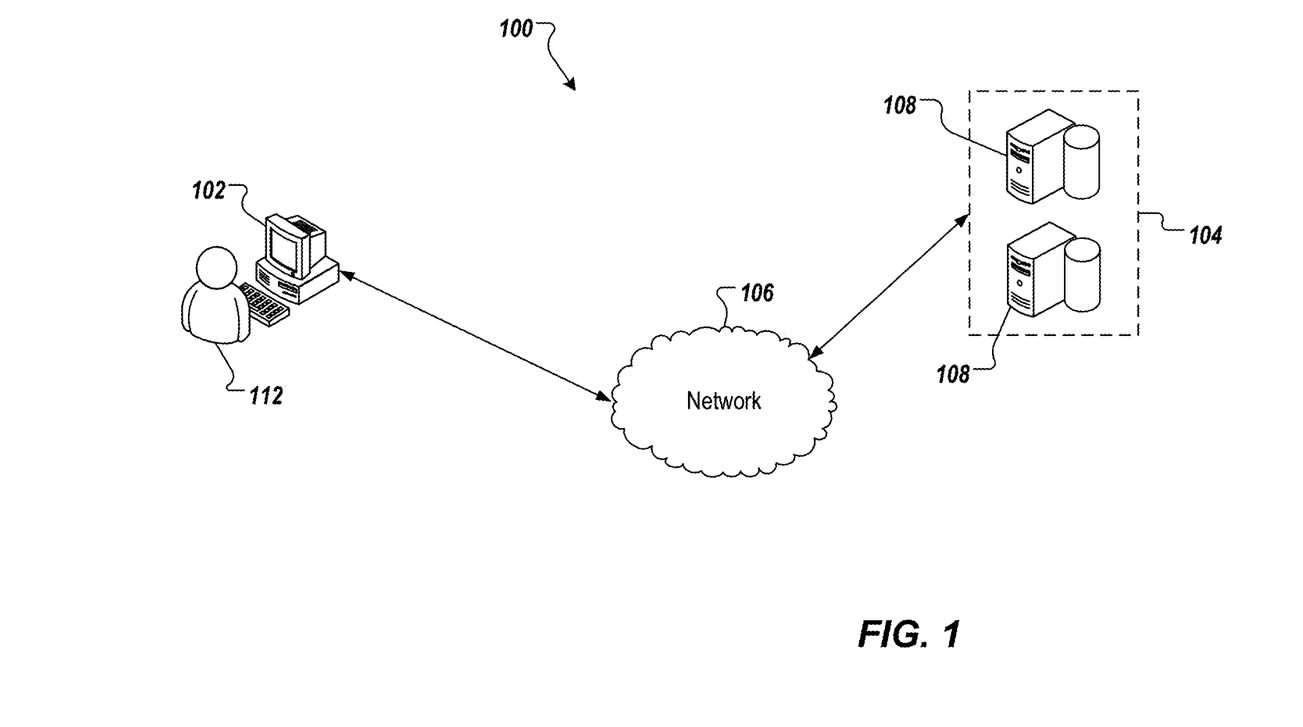
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, the server system 104 hosts an analytics system that includes a CSS of the present disclosure. For example, the user 112 can interact with the analytics system through the client device 102. In some examples, the client device 102 displays one or more UIs that enable the user 112 to provide input to and receive output from the analytics system. In some implementations, the user 112 can verbally interact with the CSS. In response, and as described in further detail herein, the CSS can process the verbal input of the user 112 to provide one or more insights (smart insights) that can be provided to the user 112. For example, the one or more insights can be displayed to the user 112 within a story that is presented by the client device 102.

Figure 2:
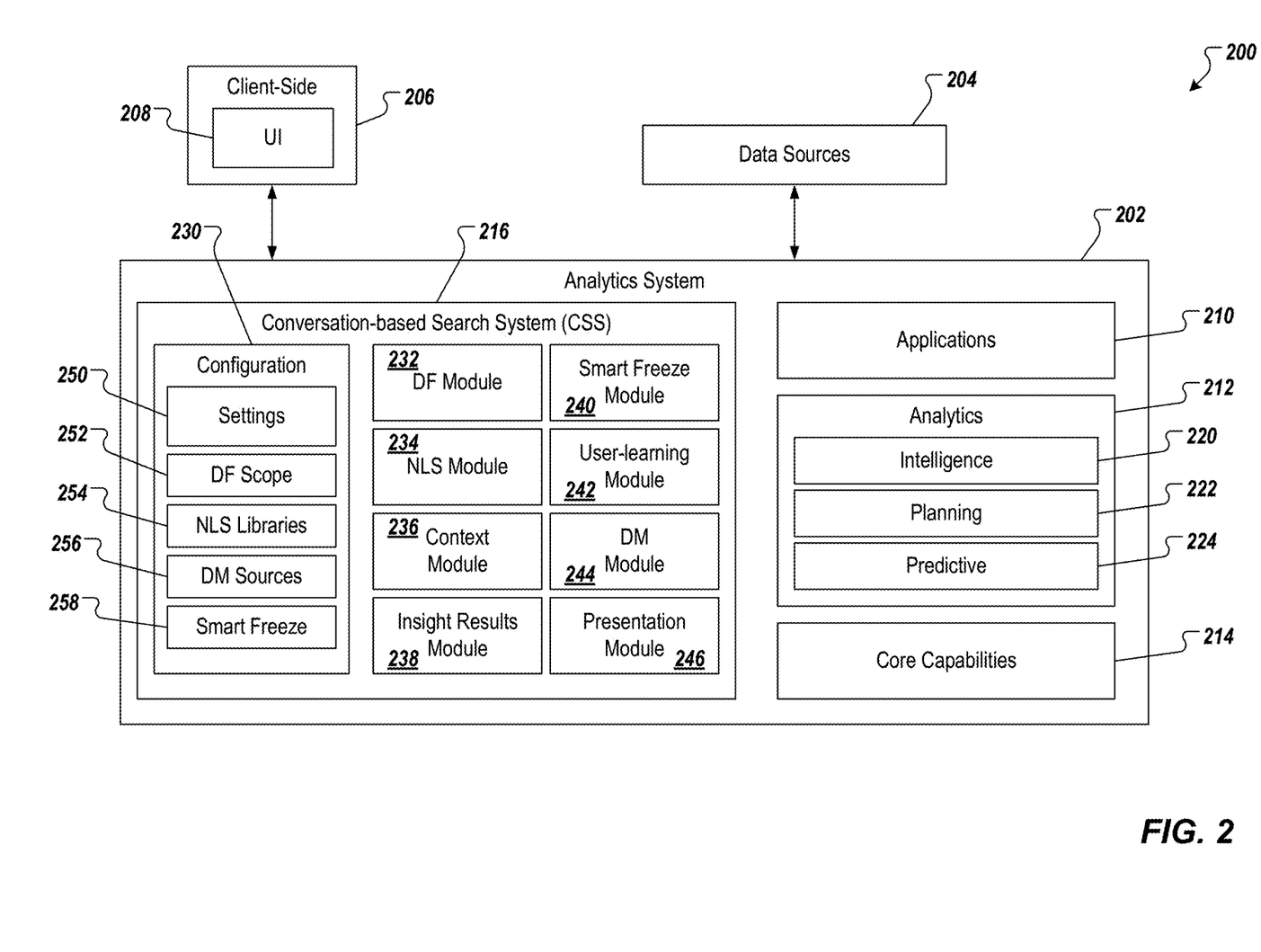
FIG. 2 depicts an example conceptual architecture including an analytics system in accordance with implementations of the present disclosure.

FIG. 2 depicts an example conceptual architecture 200 including an analytics system 202 in accordance with implementations of the present disclosure. In the depicted example, the conceptual architecture 200 further includes one or more data sources 204 and a client-side 206 (e.g., the client device 102 of FIG. 1). The client-side 206 includes a UI 208, through which a user can interact with the analytics system 202. In some examples, the one or more data sources 204 include cloud-based applications, cloud-based data sources, on-premise applications, on-premise data sources, and the like. In general, the one or more data sources 204 can include any appropriate data source that the analytics system 202 can connect to.

In the depicted example, the analytics system 202 includes one or more applications 210, analytics modules 212, one or more core capabilities modules 214, and a CSS 216. In some examples, the one or more applications 210 can include, without limitation, an enterprise summarization and analytics application (e.g., SAP Digital Boardroom) and an analytics asset aggregation application (e.g., SAP Analytics Hub). In the depicted example, the analytics modules 212 includes an intelligence module 220, a planning module 222, and a predictive module 224. In some examples, the one or more core capabilities modules 214 can include, without limitation, a data connectivity module (e.g., to connect the analytics system 202 to the one or more data sources 204), a data wrangling module (e.g., to prepare data for processing through analytics), a modeling module (e.g., to generate one or more models), and a story experience module (e.g., to provide one or more stories).

In some implementations, the CSS 216 includes a configuration module 230, a data fencing (DF) module 232, a NLS module 234, a context module 236, an insight results module 238, a smart freeze module 240, a user-learning module 242, a deep-mining module 244, and a presentation module 246. In the depicted example, the configuration module 230 includes a settings sub-module 250, a DF scope sub-module 252, one or more NLS libraries 254, one or more DM sources 256, and a smart freeze sub-module 258. Each of the components of the CSS 216 and their respective functions are described in further detail herein.

With regard to the configuration module 230, use of the CSS 230 can be configured across a set of configuration parameters. Example configuration parameters can include, without limitation, enable, roles, context limit, time zone setting, language, currency setting, usage statistic harvest, data fence (DF) scope, NLS libraries, deep-mining (DM) source enable, smart freeze enable, and smart freeze limits. For example, an administrator user can interact with the CSS 216 to establish the configuration parameters within the configuration module 230, which govern operation of the converse-to-insights process of the present disclosure. In some examples, the settings sub-module 250 stores settings that can include, without limitation, enable (e.g., a set of analytics system tenants (identified based on a universally unique identifier (UUID)) that are able to use the CSS 216 to provide converse-to-insights functionality), roles (e.g., user roles that are able to use the converse-to-insights functionality provided by the CSS 216), context limit (e.g., limiting a set of contexts to [1, . . . , n] contexts to be determined from the verbal input), a time zone setting, a language setting, a currency setting, and a setting for usage statistics harvesting.

In some examples, the DF scope sub-module 252 includes DF scope settings indicating data sources of the one or more data sources 204 that can be connected to for access by the CSS 216. In short, the DF is used to define data sources that can be accessed for processing by the CSS 216 (or data sources that are excluded from access for processing by the CSS 216). In some examples, whether a data source can be connected to by the CSS 216 can be determined based on the particular analytics system tenant and/or the particular user role. For example, the CSS 216 may be allowed access to a data source for a first analytics system tenant, but not for a second analytics system tenant. As another example, the CSS 216 may be allowed access to a data source for a first user role, but not for a second user role. In some examples, the DF scope settings can also indicate data objects within each of the one or more data sources that can be accessed (e.g., data objects owned by particular users; data objects that are shared; data objects that a particular user has permission to access).

In some examples, the one or more NLS libraries 254 include NLS libraries that can be used to provide the converse-to-insights functionality. In some examples, an NLS library 254 can execute functionality for language detection (e.g., determining which language a user's verbal input is provided in), speech-to-text conversion (e.g., converting audio data to text data), sentiment recognition (e.g., determining a sentiment, such as frustrated, happy, sad, of the user).

In some examples, the one or more DM sources 256 include data sources that can be used for deep-mining, described in further detail herein. That is, the one or more DM sources 256 indicate data sources that are enabled for deep-mining. This can include data sources that are not accessed by any of the models (e.g., analytic models, planning models). In some examples, the smart freeze sub-module 258 stores a setting indicating whether smart freeze is enabled (e.g., for particular user and/or role) and can include one or more limits. Example limits can include a number of visualizations and/or types of visualizations (e.g., chart, graph, table) that smart freeze can be limited to.

In accordance with implementations of the present disclosure, and as introduced above, a user can interact with the analytics system. In some implementations, the user can request access to the CSS 216 to use the converse-to-insights functionality. In some examples, and based on the configuration settings, it can be determined whether the user is able to access the CSS 216 to use the converse-to-insights functionality. For example, one or more of an identifier of the user (e.g., an identifier that uniquely identifies the user), a role of the user, and a UUID of the analytics system tenant the user is accessing can be compared to respective permissions settings (included in the configuration settings) to determine whether the user is able to access the CSS 216 to use the converse-to-insights functionality.

In some implementations, if the user is able to access the CSS 216 to use the converse-to-insights functionality, a data fence for the user is determined by the DF module 232. In some examples, determining the data fence includes determining the user (e.g., the identifier of the user), determining one or more roles associated with the user, and identifying one or more of data objects within data sources, data source systems, spaces, and metadata repositories that can be accessed to perform the converse-to-insights functionality. For example, the identifier of the user can be used to identify data objects owned by the user (e.g., created by the user within the analytics system). As another example, one or more roles associated with the user can be used to identify data objects that the user is able to access (e.g., role-based permissions). As another examples, the identifier of the user can be used to identify data objects that the user has been granted permission to access (e.g., shared objects).

In some examples, source systems can include one or more cloud-based systems and/or one or more on-premise systems that store data that may be relevant to user queries. Example source systems can include, without limitation, an enterprise resource planning (ERP) system, a customer relationship management (CRM) system, a human capital management (HCM) system, and a data warehouse (DW) system. In some examples, a space is a logical separation of data (e.g., within a source system). For example, a first space (e.g., marketing) and a second space (e.g., sales) are defined, and data and/or models can be assigned to one or both of the first space and the second space. Users can be granted access to respective spaces.

In some implementations, the NLS module 234 processes the verbal input provided by the user. For example, speech of the user can be received by a microphone, which provides the verbal input as audio (e.g., streaming audio, audio file). In some examples, the NLS module 234 processes the verbal input to determine a language that the user is speaking (e.g., English, French, German) and selects an appropriate NLS library for further processing of the verbal input (e.g., if English is detected, the NLS library for English is selected). In some implementations, the NLS module 234 uses the NLS library to convert the audio data (verbal input) to text data (e.g., speech-to-text), and processes the text input for recognition and response.

By way of non-limiting example, the following example conversation can be considered (where U indicates user input and CSS indicates CSS output (e.g., audible, textual)):

U: How am I doing?
CSS: Hi James. Would you like to know how you are doing in terms of sales, finance, HR, or some other area?
U: How am I performing with respect to sales?
CSS: Are you looking for overall sales, or sales with respect to particular products, locations, and/or timeframes, or the like?
U: I am interested in sales of [PRODUCT_X] and [PRODUCT_Y] in North America over the last year.

With non-limiting reference to the above example conversation, the text data provided from the user can be processed to determine an intent of the user (e.g., a query) and/or a context. In the example above, the text [How am I doing] can be processed (e.g., using natural language processing (NLP) through a NLS module) to determine that the user is asking a general question about performance, the context being performance.

In some examples, one or more contexts, if any are detected, and one or more domains, if any are detected, are refined by the NLS module 234 for response preparation. In some examples, refinement means that the context or domain is excluded from further processing. For example, it can be determined that a context or domain of the text data is not a context or domain that the particular user is authorized to query. For example, payroll can be filtered from further use in the progression of the conversation, if the user is not authorized to access payroll information.

In some examples, if a particular domain is not determinable from the user input, a response can be provided to elicit one or more domains that the user is interested in.

In some implementations, data associated with the user can be used to formulate a response from the CSS. For example, each user can have a user profile associated therewith, the user profile indicating one or more roles, with which the user is associated. In some examples, each role can be associated with one or more domains. Example domains can include, without limitation, sales, finance, human resources, products, manufacturing, and the like. In the example above, it can be determined that the user has one or more roles that associate the user with the domains of sales, finance, and human resources (HR). Consequently, the response [ . . . how you are doing in terms of sales, finance, HR, or some other area?] is provided.

In some implementations, a domain can be provided as a measure, as described above with reference to models that define measures and dimensions, create calculations, set up hierarchical relationships, geo-enrich data, and the like. For example, sales can be a measure of a model. In some examples, each measure can be associated with one or more dimensions. For example, sales can be associated with dimensions of time, location, product. In some examples, each dimension can have one or more sub-dimensions. For example, the time dimension can include sub-dimensions of year, each sub-dimension of year can include sub-dimensions of quarter, each sub-dimension of quarter can include sub-dimensions of month, each sub-dimension of month can include sub-dimensions of week, and so on. As another example, the product dimension can include sub-dimensions of category, and each sub-dimension of category can include sub-dimensions of line. As another example, the location dimension can include sub-dimensions of country, each sub-dimension of country can include sub-dimensions of region (e.g., north, east, west, south, mid-west), each sub-dimension of region can include sub-dimensions of sub-region (e.g., state, province), and each sub-dimension of sub-region can include sub-dimensions of city.

In the example conversation above, it can be determined that the measure of sales is associated with dimensions of product, location, and time. Consequently, the response [Are you looking for overall sales, or sales with respect to particular products, locations, and/or timeframes, or the like?] is provided.

In some examples, the NLS module 234 builds (or rebuilds) models for response dispensing. In some examples, the NLS module 234 matches and classifies models based on one or more of numeric prediction, optimization, and probability assessment for response dispensing. In some examples, the NLS module 234 rebuilds model libraries using one or more of semantics, tokenization, stemming, and parsing.

In some implementations, the context module 236 receives the NLS output provided from the NLS module 234 and processes the NLS output to provide a set of contexts and/or a set of domains. In some examples, the context module 236 refines the set of contexts based on any exclusions included in the configuration (e.g., the settings 250). For example, and as described above, if a user is not authorized to access particular information (e.g., payroll) the context (or domain) is filtered from further processing. In some examples, the contexts within the set of contexts and the domains within the set of domains are put in respective rank orders, and the ranked contexts and ranked domains are finalized and refined for content-to-datascope mapping.

In some implementations, the insight results module 238 performs context-to-datascope mapping to provide a set of insight results. More particularly, the insight results module 238 receives and analyzes the ranked context and ranked domains received from the NLS module 234. In some examples, contexts and domains can be ranked based on patterns associated with the user. For example, if frequencies with which the user queries on contexts/domains can be maintained, and a context/domain with a higher frequency from the user can be ranked higher than a context domain with a lower frequency from the user. In some examples, the insight results module 238 refines and groups domain models, objects, sources, semantics, and repositories.

In some examples, if the configuration settings indicate that DM of sources is to be performed, the DM module 244 operates to provide DM results from DM resources, as described in further detail herein. In some examples, the DM module 244 collects sources that were not used in models and/or objects. In some examples, the DM module 244 collects metadata sources for identified orphan sources. In some examples, the DM module 244 collects context to datascope dispense requirement queries. In some examples, the DM module 244 adds threads to span on the sources. In some examples, the DM module 244 collects, collates, and feeds results back to the insight results module 238. In some examples, the DM module 244 collects repository/table/object/views of source systems which got models but not all the objects part of sources are utilized.

In some examples, the DM module 244 provides output for updating user-learning, as described in further detail herein.

In some examples, the identified objects (including any objects provided from deep-mining) are ranked by the insight results module 238 using best-fit based on context and ranking.

In some examples, the insight results module 238 prepares queries to dispense results based on the identified models. For example, and referring again to the example conversation above, the insight results module 238 can provide a query in response to the user statement that [I am interested in sales of [PRODUCT_X] and [PRODUCT_Y] in North America over the last year]. Consequently, a query can be generated to provide a query result that, in this example, provides a sales number for PRODUCT_X and a sales number for PRODUCT_Y for sales occurring in North America. In some examples, the insight results module 238 executes the queries and receives results. For example, the query is transmitted to one or more data sources within the data fence, each data source providing a query result.

In some examples, the insight results module 238 provides the results for display to the user. In some examples, the user can interact with displayed results. In response to user interaction on a result (insight), the insight results module 238 reads the interconnected context based on user reviewed insights. In some examples, the insight results module 238 refines and ranks the interconnected context excluding the current context. In some examples, the insight results module 238 identifies objects and ranks which objects have the best-fit based on interconnected context. In some examples, the insight results module 238 determines whether a required depth of insight has been achieved. In some examples, a depth of insight can be indicated by the user. For example, if the user is satisfied with the insight(s) provided and does not desire to drill-down to generate more detailed insights, the user can indicate as such (e.g., click on a UI element that indicates that the depth of insight is satisfied).

If the required depth of insight has been achieved, the insight can be added to a story. For example, the user can indicate that the insights provided to this point suffice for the user's needs. Consequently, the user can indicate that the required depth of insight has been achieved (e.g., selecting an interface element displayed within a UI). If the required depth of insight has not been achieved, it is determined whether the current depth of insight is usable in another context. If the current depth of insight is not usable in another context, the insight results module 238 continues to monitor user input (e.g., continued verbal input provided by the user) to insights to further determine interconnected contexts and build on the depth of insight. If the current depth of insight is usable in another context, the insight results module 238 provides the current depth of insight to the smart freeze module 240 for further processing. For example, the user can indicate that the current depth of insight usable and can initiate smart freeze (if enabled) to capture the intermediate insight for use in a subsequent story (e.g., selecting an interface element displayed within a UI).

In some implementations, the smart freeze module 240 receives a status and results from the insight results module 238. It can be determined whether the insights received to this point are final. For example, the user can provide input indicating that the insights received to this point are final. If final, the user can interact with functionality of the presentation module 246 to finalize the story. If not final, the insight results module 238 continues to monitor user input (e.g., continued verbal input provided by the user) to insights to further determine interconnected contexts and build on the depth of insight.

In some implementations, the presentation module 246 finalizes presentation of the insights, for example, in the form of a story. In some examples, the presentation module 246 receives status and results from the insight results module 238. In some examples, it is determined whether a story is to be created with the auto-generated story name. If a story is to be created with the auto-generated story name, the story is created. If a story is not to be created with the auto-generated story name, an existing story is selected. For example, the user selects the existing story from a list of one or more existing stories. In some implementations, the presentation module 246 transfers content of any smart freeze and dependent models and metadata are transferred for inclusion in the story. The store is displayed to the user. In some examples, the user can determine whether to finalize the story or continue developing additional insights that can be included in the story. In some implementations, the user can edit the story (e.g., rename the story, reorganize visualizations depicted in the story). The story can be stored for subsequent referral. The story can be shared with one or more other users.

In some implementations, the user-learning module 242 generates a user profile of the user based on the user's interactions with the CSS 216 and provides feedback to the user. In some examples, the user-learning module 242 sets a default language of the user to the language used in the user's interactions with the CSS 216. In some examples, the user-learning module 242 records user interactions, model usage, and time spent using the CSS 216. In some examples, the user-learning module 242 records metadata usage including, but not limited to occurrences, sources, models, objects, stories (created/updated), audit of results for failed attempts and actions, and size of data results. In some examples, the user-learning module 242 generates a user profile, which can record, among other factors, type of usage, time of usage, average duration of stay, area of interest, character, behavioral, progressive learning, and contribution to user community.

Figure 3:
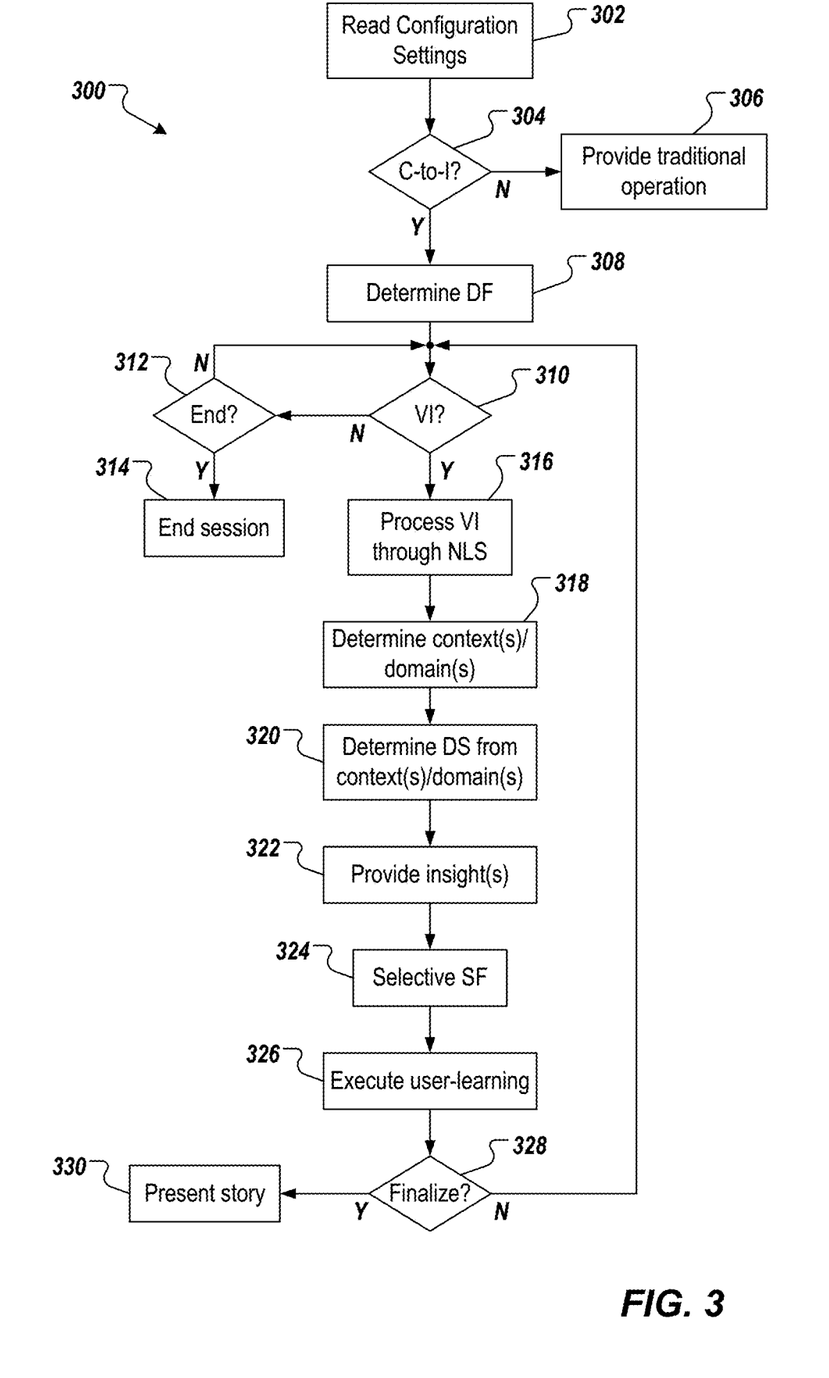
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

Configuration settings are read (302). For example, in response to a user logging into an analytics system to begin a session of analytics, configuration settings (e.g., configuration settings 250 of FIG. 2) are read. It is determined whether converse-to-insights functionality is enabled (304). For example, and as described herein, it can be determined whether the user is able to access the CSS 216 to use the converse-to-insights functionality. For example, one or more of an identifier of the user (e.g., an identifier that uniquely identifies the user), a role of the user, and a UUID of the analytics system tenant the user is accessing can be compared to respective permissions settings (included in the configuration settings) to determine whether the user is able to access the CSS 216 to use the converse-to-insights functionality. If converse-to-insights functionality is not enabled (306), traditional operation is provided. For example, traditional text-to-insights functionality is provided, through which the user provides textual input.

If converse-to-insights functionality is enabled, a data fence is determined (308). For example, and as described herein, determining the data fence includes determining the user (e.g., the identifier of the user), determining one or more roles associated with the user, and identifying one or more of data objects within data sources, data source systems, spaces, and metadata repositories that can be accessed to perform the converse-to-insights functionality.

It is determined whether verbal input (VI) has been received (310). For example, it can be determined whether the user has provided verbal input to the CSS 216 (e.g., through a microphone of a computing device). If verbal input has not been received, it is determined whether the session is to end (312). For example, it can be determined whether the user has indicated an end to the session with the analytics system (e.g., logging out). If the session is to end, the session is ended (314). If the session is not to end, the example process 300 loops back.

If verbal input is received, the verbal input is processed through NLS (316) and one or more contexts and/or domains are determined (318). For example, and as described herein, the verbal input is processed to provide text data, and the text data is processed to determine one or more contexts. In some examples, additional verbal input is elicited from the user to determine the one or more contexts, as described above with reference to the example conversation.

A data scope is determined from the one or more contexts and/or domains (320) and one or more insights are provided (322). For example, and as described herein, one or more data sources are identified (within the data fence) for querying to retrieve data responsive to the verbal input of the user. In some examples, an insight (e.g., a data visualization summarizing the data) is provided. Smart freeze is selectively performed (324). For example, if smart freeze is enabled and the user selects to execute smart freeze functionality, the smart freeze functionality is performed.

User-learning is executed (326). For example, user interaction with the CSS 216 is recorded and one or more metrics are provided. Example metrics can include, without limitation, a frequency at which the user indicates a context or a domain. In this manner, subsequent interactions of the user with the CSS 216 can be managed based on knowledge of the user. For example, a first domain (e.g., sales) can be ranked higher than a second domain (e.g., HR), if the frequency associated with the first domain is higher than the frequency associated with the second domain.

It is determined whether the story is to be finalized (328). For example, and as described herein, a story can be provided and can include one or more visualizations of data and/or text that describes data. In some examples, a visualization is provided as an insight that visually summarizes data. If the story is not to be finalized, the example process 300 loops back. If the story is to be finalized, the story is processed and is presented (330).

Figure 4:
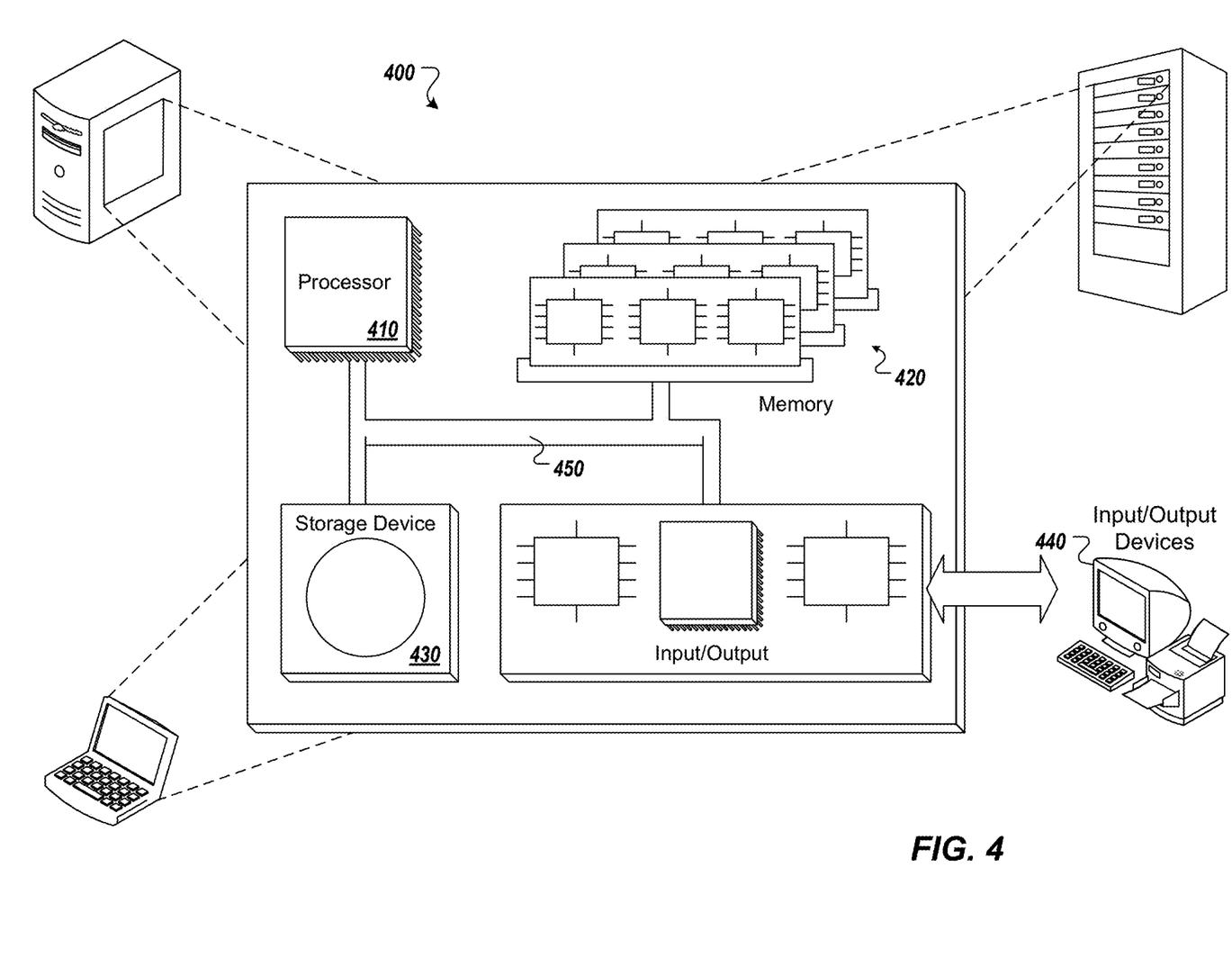
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing insights from an analytics system based on verbal input of a user, the method being executed by one or more processors and comprising:
   receiving, by a conversation-based search system (CSS) of an analytics system, verbal input from a user during a session between the user and the CSS, the CSS providing a user profile of the user based on interactions of the user with the CSS;
   providing, by the CSS, text input based on the verbal input;
   processing, by the CSS, the text input to determine a set of contexts, a number of contexts in the set of contexts being limited by a context limit defined in a configuration, each context in the set of contexts representing one or more operations of an enterprise, contexts are provided in the set of contexts based on one or more patterns associated with the user in the user profile;
   determining, by the CSS, a set of insights based on the set of contexts, each insight representative of a performance of the enterprise;
   receiving, by a smart freeze module of the CSS, user input indicating that a current depth of insight is usable and, in response, storing one or more insights in the set of insights for use in a subsequent session; and
   displaying, by the analytics system and during the session, a story comprising one or more visualizations, each visualization depicting at least one insight.

2. The method of claim 1, wherein the text input is provided by processing the verbal input through one or more natural language system (NLS) libraries.

3. The method of claim 1, further comprising determining a data fence for the user at least partially based on a role that is assigned to the user, the data fence determining one or more data sources to be accessed to determine the set of contexts.

4. The method of claim 1, further comprising determining that a configuration setting indicates that the CSS is accessible to the user, and in response, enabling the CSS to receive the verbal input from the user.

5. The method of claim 1, further comprising providing an intermediate story based on at least one insight of the one or more insights, wherein at least a portion of the intermediate story is included in the story.

6. The method of claim 1, wherein at least one context is determined as a leading context and at least one context is determined as an intermediate context.

7. The method of claim 1, wherein contexts in the set of contexts are provided in a rank order.

8. A non-transitory computer-readable storage medium coupled to one or more processors and having instructions stored thereon which, when executed by the one or more processors, cause the one or more processors to perform operations for providing insights from an analytics system based on verbal input of a user, the operations comprising:
   receiving, by a conversation-based search system (CSS) of an analytics system, verbal input from a user during a session between the user and the CSS, the CSS providing a user profile of the user based on interactions of the user with the CSS;
   providing, by the CSS, text input based on the verbal input;
   processing, by the CSS, the text input to determine a set of contexts, a number of contexts in the set of contexts being limited by a context limit defined in a configuration, each context in the set of contexts representing one or more operations of an enterprise, contexts are provided in the set of contexts based on one or more patterns associated with the user in the user profile;
   determining, by the CSS, a set of insights based on the set of contexts, each insight representative of a performance of the enterprise;
   receiving, by a smart freeze module of the CSS, user input indicating that a current depth of insight is usable and, in response, storing one or more insights in the set of insights for use in a subsequent session; and
   displaying, by the analytics system and during the session, a story comprising one or more visualizations, each visualization depicting at least one insight.

9. The computer-readable storage medium of claim 8, wherein the text input is provided by processing the verbal input through one or more natural language system (NLS) libraries.

10. The computer-readable storage medium of claim 8, wherein operations further comprise determining a data fence for the user at least partially based on a role that is assigned to the user, the data fence determining one or more data sources to be accessed to determine the set of contexts.

11. The computer-readable storage medium of claim 8, wherein operations further comprise determining that a configuration setting indicates that the CSS is accessible to the user, and in response, enabling the CSS to receive the verbal input from the user.

12. The computer-readable storage medium of claim 8, wherein operations further comprise providing an intermediate story based on at least one insight of the one or more insights, wherein at least a portion of the intermediate story is included in the story.

13. The computer-readable storage medium of claim 8, wherein at least one context is determined as a leading context and at least one context is determined as an intermediate context.

14. The computer-readable storage medium of claim 8, wherein contexts in the set of contexts are provided in a rank order.

15. A system, comprising:
a computing device; and
a computer-readable storage device coupled to the computing device and having instructions stored thereon which, when executed by the computing device, cause the computing device to perform operations for providing insights from an analytics system based on verbal input of a user, the operations comprising:
  receiving, by a conversation-based search system (CSS) of an analytics system, verbal input from a user during a session between the user and the CSS, the CSS providing a user profile of the user based on interactions of the user with the CSS;
  providing, by the CSS, text input based on the verbal input;
  processing, by the CSS, the text input to determine a set of contexts, a number of contexts in the set of contexts being limited by a context limit defined in a configuration, each context in the set of contexts representing one or more operations of an enterprise, contexts are provided in the set of contexts based on one or more patterns associated with the user in the user profile;
  determining, by the CSS, a set of insights based on the set of contexts, each insight representative of a performance of the enterprise;
  receiving, by a smart freeze module of the CSS, user input indicating that a current depth of insight is usable and, in response, storing one or more insights in the set of insights for use in a subsequent session; and
  displaying, by the analytics system and during the session, a story comprising one or more visualizations, each visualization depicting at least one insight.

16. The system of claim 15, wherein the text input is provided by processing the verbal input through one or more natural language system (NLS) libraries.

17. The system of claim 15, wherein operations further comprise determining a data fence for the user at least partially based on a role that is assigned to the user, the data fence determining one or more data sources to be accessed to determine the set of contexts.

18. The system of claim 15, wherein operations further comprise determining that a configuration setting indicates that the CSS is accessible to the user, and in response, enabling the CSS to receive the verbal input from the user.

19. The system of claim 15, wherein operations further comprise providing an intermediate story based on at least one insight of the one or more insights, wherein at least a portion of the intermediate story is included in the story.

20. The system of claim 15, wherein at least one context is determined as a leading context and at least one context is determined as an intermediate context.

* * * * *